US008913573B2

(12) United States Patent
Chen et al.

(10) Patent No.: US 8,913,573 B2
(45) Date of Patent: Dec. 16, 2014

(54) SCHEDULING OF DEVICE-TO-DEVICE COMMUNICATION

(75) Inventors: Tao Chen, Espoo (FI); Gilles Charbit, Farnborough Hampshire (GB); Timo Kalevi Koskela, Oulu (FI); Sami-Jukka Hakola, Kempele (FI); Mikko Juhana Rinne, Espoo (FI); Yrjö Olavi Kaipainen, Espoo (FI)

(73) Assignee: Nokia Corporation, Espoo (FI)

( * ) Notice: Subject to any disclaimer, the term of this patent is extended or adjusted under 35 U.S.C. 154(b) by 196 days.

(21) Appl. No.: 13/501,749

(22) PCT Filed: Oct. 30, 2009

(86) PCT No.: PCT/IB2009/007277
§ 371 (c)(1),
(2), (4) Date: May 11, 2012

(87) PCT Pub. No.: WO2011/051745
PCT Pub. Date: May 5, 2011

(65) Prior Publication Data
US 2012/0213183 A1  Aug. 23, 2012

(51) Int. Cl.
*H04W 4/00*  (2009.01)
*H04W 72/12*  (2009.01)
*H04W 76/02*  (2009.01)

(52) U.S. Cl.
CPC ........ *H04W 72/1278* (2013.01); *H04W 76/023* (2013.01)
USPC .......................................................... 370/329

(58) Field of Classification Search
USPC ......... 370/252, 329, 330, 336, 340, 341, 345, 370/395.4, 431, 436, 478; 455/450, 509
See application file for complete search history.

(56) References Cited

U.S. PATENT DOCUMENTS

| | | | |
|---|---|---|---|
| 2006/0168343 A1* | 7/2006 | Ma et al. ........................ | 709/245 |
| 2007/0104138 A1* | 5/2007 | Rudolf et al. ................. | 370/329 |
| 2009/0005094 A1* | 1/2009 | Lee et al. ....................... | 455/509 |
| 2009/0238090 A1* | 9/2009 | Sambhwani et al. ......... | 370/252 |
| 2010/0113004 A1* | 5/2010 | Cave et al. ................. | 455/422.1 |
| 2010/0311433 A1* | 12/2010 | Lindskog et al. ............. | 455/450 |

FOREIGN PATENT DOCUMENTS

| | | |
|---|---|---|
| EP | 1343340 A1 | 9/2003 |
| WO | 2010/078273 A2 | 7/2010 |

OTHER PUBLICATIONS

International Search Report and Written Opinion received for corresponding International Patent Application No. PCT/IB2009/007277, dated Jul. 27, 2010, 17 pages.

Doppler et al., "Innovative Concepts in Peer-To-Peer and Network Coding", vol. 1.0, Jan. 16, 2009, pp. 1-25.

(Continued)

*Primary Examiner* — Edan Orgad
*Assistant Examiner* — Saumit Shah
(74) *Attorney, Agent, or Firm* — Harrington & Smith

(57) ABSTRACT

A method, system, apparatus, and computer program can provide scheduling of direct to direct communication by a high speed packet access base station. The method, for example, can include obtaining a direct user equipment communication toggling message. The method can also include interpreting physical layer signaling on a first frequency of a first radio system based on the toggling message. The method can further include scheduling a direct user equipment pair on a second frequency of a second system based on the interpreting. The toggling message can include a triggering message to initiate direct user equipment communication or an exit message to terminate direct user equipment communication.

20 Claims, 5 Drawing Sheets

(56) References Cited

OTHER PUBLICATIONS

U.S. Appl. No. 61/109,442, "Apparatus and method for dynamic communication resource allocation for device-to-device communications in a wireless communication system", filed Oct. 29, 2008, 27 pages.

U.S. Appl. No. 12/604,733, "Systems, methods, and apparatuses for facilitating device-to device connection establishment", filed Oct. 23, 2009, 40 pages.

* cited by examiner

SCHEDULING OF DEVICE-TO-DEVICE COMMUNICATION

RELATED APPLICATION

This application was originally filed as PCT Application No. PCT/IB2009/007277 filed Oct. 30, 2009.

BACKGROUND

1. Field

Direct communication between end user terminals is particularly discussed in the context of wireless communication. Techniques, systems, and other technology for providing operation of a direct-to-direct user on a high speed packet access frequency band for cellular mode communication and operation of the direct-to-direct user on a long term evolution direct-to-direct user frequency band for direct-to-direct communication are presented, which may be relevant to wireless mobile devices and high-volume network infrastructure, and related components (chipsets).

2. Description of the Related Art

In the following it is assumed that device-to-device (D2D) communication is available at Long Term Evolution (LTE) cells using an LTE air interface of $3^{rd}$ Generation Partnership Project (3GPP). When a D2D user is moving from an LTE cell to a High Speed Packet Access (HSPA) cell, the HSPA system may not able to support the D2D communication. The area of LTE deployment may be smaller than that of the HSPA system, especially in the beginning of LTE deployment. So, D2D usage would be expected to be quite low due to the limited deployment of LTE D2D capable evolved Node Bs (eNBs). Furthermore, one challenge may be how to utilize existing infrastructure to assist LTE D2D communication with as minor modifications to the HSPA system as possible.

In many networks, it is expected that the cellular system should operate in the same frequency band as the D2D communication. Then the cellular system is responsible for the resource allocation or division among D2D users and cellular users.

SUMMARY

One embodiment of the present invention is a method that includes obtaining a direct user equipment communication toggling message. The method also includes interpreting physical layer signaling on a first frequency of a first radio system based on the toggling message. A direct user equipment pair is scheduled based on the interpreting. The toggling message includes a triggering message to initiate direct user equipment communication or an exit message to terminate direct user equipment communication.

In another embodiment, the method includes providing a direct user equipment communication toggling message. A reinterpretation message responsive to the toggling message is obtained. The method further includes reinterpreting physical layer signaling on a first frequency of a first radio system based on the reinterpretation message, wherein the direct user equipment communication is to be conducted on a second frequency of a second radio system. The toggling message includes a triggering message to initiate direct user equipment communication or an exit message to terminate direct user equipment communication.

Other embodiments of the present invention include a computer program encoded on a computer-readable medium, which, when executed on a computer processor, performs a method according to any one of the preceding methods.

A further embodiment of the present invention is an apparatus including at least one memory including computer program code and at least one processor. The at least one memory and the computer program code are configured to, with the at least one processor, cause the apparatus at least to obtain a direct user equipment communication toggling message. The at least one memory and the computer program code are also configured to, with the at least one processor, cause the apparatus at least to interpret physical layer signaling on a first frequency of a first radio system based on the toggling message. The at least one memory and the computer program code are further configured to, with the at least one processor, cause the apparatus at least to schedule a direct user equipment pair on a second frequency of a second system based on the interpreting. The toggling message includes a triggering message to initiate direct user equipment communication or an exit message to terminate direct user equipment communication.

An additional embodiment of the present invention is an apparatus including at least one memory including computer program code and at least one processor. The at least one memory and the computer program code are configured to, with the at least one processor, cause the apparatus at least to provide a direct user equipment communication toggling message. The at least one memory and the computer program code are also configured to, with the at least one processor, cause the apparatus at least to obtain a reinterpretation message responsive to the toggling message. The at least one memory and the computer program code are further configured to, with the at least one processor, cause the apparatus at least to reinterpret physical layer signaling on a first frequency of a first radio system based on the reinterpretation message, wherein the direct user equipment communication is to be conducted on a second frequency of a second radio system. The toggling message includes a triggering message to initiate direct user equipment communication or an exit message to terminate direct user equipment communication.

Another embodiment of the present invention includes an apparatus. The apparatus includes obtaining means for obtaining a direct user equipment communication toggling message. Interpreting means are provided for interpreting physical layer signaling on a first frequency of a first radio system based on the toggling message. The apparatus further includes scheduling means for scheduling a direct user equipment pair on a second frequency of a second system based on the interpreting. The toggling message includes a triggering message to initiate direct user equipment communication or an exit message to terminate direct user equipment communication.

A further embodiment of the present invention is an apparatus. The apparatus includes providing means for providing a direct user equipment communication toggling message. The apparatus also includes obtaining means for obtaining a reinterpretation message responsive to the toggling message. The apparatus further includes reinterpreting means for reinterpreting physical layer signaling on a first frequency of a first radio system based on the reinterpretation message, wherein the direct user equipment communication is to be conducted on a second frequency of a second radio system. The toggling message includes a triggering message to initiate direct user equipment communication or an exit message to terminate direct user equipment communication.

BRIEF DESCRIPTION OF THE DRAWINGS

For proper understanding of the invention, reference should be made to the accompanying drawings, wherein.

DETAILED DESCRIPTION

Figure 1:
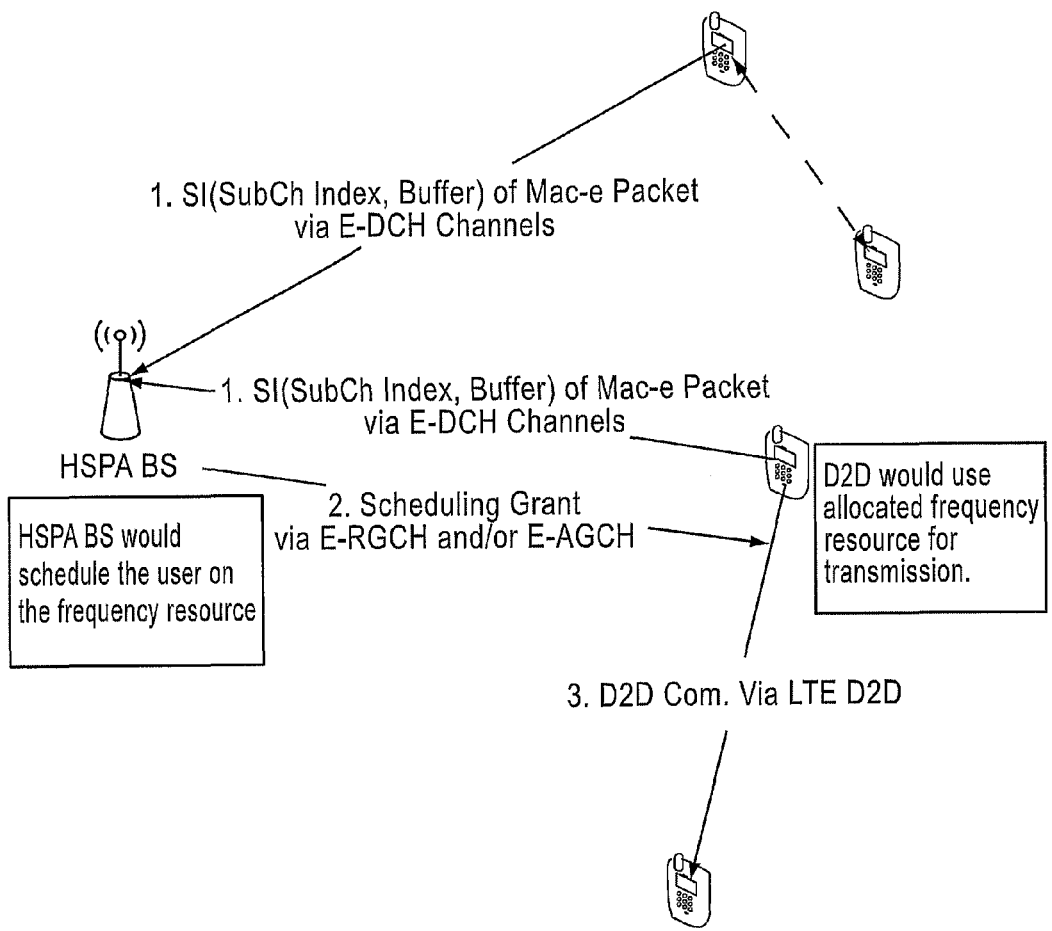
FIG. 1 illustrates a high speed packet access system assisted long term evolution direct-to-direct communication.

Certain embodiments of the present invention are related to direct device-to-device (D2D), mobile-to-mobile (M2M), terminal-to-terminal (T2T), and/or peer-to-peer (P2P) communication integrated into a cellular network, e.g. Global System for Mobile communication (GSM)/High Speed Packet Access (HSPA)/Long Term Evolution (LTE)/LTE-A cellular network specified in 3rd Generation Partnership Project (3GPP). Certain embodiments of the present invention are more specifically related to a network in which the cellular network operates in different frequency band than the D2D connections. For example, the cellular system can be an HSPA system with an HSPA frequency band, and the D2D user can operate on the HSPA frequency band for cellular mode communication and an LTE D2D frequency band for D2D communication. Thus, the D2D user may employ HSPA cellular mode and/or LTED2D mode.

Such multi-mode operation may be accomplished by providing signaling support for an HSPA base station to schedule LTE D2D transmission. Specifically, there may be re-interpretation of HSPA signaling messages to support D2D connections (via LTE or LTE-A) within an HSPA network coverage area.

By applying such a method, one radio system's base station may be used to control in one frequency the User Equipment (UE) D2D operation on another radio system in another frequency. Thus, certain embodiments of the present invention relate to the case where the D2D resources of one radio interface are managed over another and use the HSPA-LTE D2D pairing of the invention report as a specific non-restrictive implementation.

Once LTE D2D users are moving out of the coverage of LTE system, the other system may not conventionally assist D2D communication. A D2D user may be equipped with some variety of LTE-advanced device equipped with HSPA/LTE/LTE D2D transceivers. Furthermore, the LTE-advanced device can support multi-carriers in LTE D2D devices, as LTE-A can include multi-carrier capability. LTE D2D may operate on the LTE frequency carrier, which can be different from the co-existing GSM/HSPA operating carriers. During cell selection, the LTE D2D UE may camp on an HSPA cell using the different frequency carriers than that of LTE D2D.

The LTE D2D user can easily find the neighbor D2D users as explained in "UE identification management to facilitate UE initiated D2D connection establishment in advanced cellular network" U.S. patent application Ser. No. 12/604,733, which is hereby incorporated herein by reference in its entirety. The LTE D2D user can decide the MCS by themselves without eNB involvement, as discussed in "Dynamic Resource Allocation for Device to Device Communications" U.S. Patent Application No. 61/109,442, which is hereby incorporated herein by reference in its entirety.

One embodiment of the present invention relates to a method for HSPA Base Station (BS) functions. It should be noted that, as used herein, the term "base station" should be understood broadly to include similar structural and functional entities. Thus, for example, an evolved Node B (eNB) is one example of a base station.

In certain embodiments of the present invention two new L2/L3 signaling messages are received at the BS from the UE. Those two messages can be a message triggering D2D and a message exiting D2D. These messages may be referred to as toggling messages, because they may toggle the on/off status of D2D. An HSPA BS can decide how to reinterpret the physical layer signaling and schedule D2D pair in view of these messages.

HSPA BS can make a schedule for D2D UEs for non-contention based access on LTE D2D frequency resources according to D2D UEs' scheduling requests sent over HSPA channels. The HSPA BS can grant frequency resources, characterized by D2D carrier index and subchannel index, for the scheduled D2D pairs with existing HSPA channels such as Enhanced Dedicated Channel (E-DCH), Relative Grant Channel (E-RGCH), E-DCH Absolute Grant Channel(E-AGCH), or High Speed Shared Control Channel (HS-SCCH). The re-interpretation of the physical channels could be performed, as discussed below.

In the case of E-RGCH in the serving cell, 1 bit information previously used for UP/DOWN commands in High Speed Uplink Packet Access (HSUPA), can now indicate whether the corresponding D2D pair is scheduled. In the case of E-AGCH, 5 bits information previously used for E-DCH Dedicated Physical Data Channel (E-DPDCH)/E-DCH Dedicated Physical Control Channel (E-DPCCH) power ratio information in HSUPA, can now indicate which frequency resource (for example, subchannel) is scheduled for the corresponding D2D pair. In the case of E-AGCH, 1 bit previously used for process applicability, can now indicate the resource allocation lifetime. For example, "0" can mean current TTI, while "1" can mean "a period" such as 10 ms, which can be configured by a higher layer. Thus, the reinterpretation can avoid any direct impact on the physical layer.

When multiple D2D pairs are requesting the same resource, the HSPA BS would schedule the most suitable one based on a suitable scheduler. Examples of suitable schedules include Round Robin and semi-persistent scheduling. Furthermore, the BS may support resource allocation for D2D pairs in one Transmission Time Interval (TTI) or a period which can be handled by the command in E-RGCH. For example, if no "DISABLE" is sent to the earlier scheduled D2D pair, that earlier scheduled D2D pair can use the earlier allocated resource for the transmission as long as possible or for a period configured by higher layer signaling. The D2D pair can also release the allocated resource by sending new Scheduling Information (SI) indicating no resource required.

BS may also be able to indicate that the cell is able to support LTE D2D. This indication may be provided, for example, in the system information block with minor modification to the current System Information Blocks (SIBs)) or Layer Three (L3) signaling.

In certain embodiments of the present invention two new L2/L3 signaling messages are sent to the BS from the UE. Specifically, two new L2/L3 signaling messages may be used to trigger D2D mode or exit D2D mode by the UE/BS. Then both UE and BS can work in D2D mode by re-interpreting the HSPA physical layer signaling.

The D2D UE can send a D2D scheduling request to an HSPA NB using HSUPA Scheduling Information (SI) element in an enhanced Media Access Control (Mac-e) packet carried over an E-DCH channel, indicating which frequency resource would be preferred for LTE D2D communication.

The SI in the Mac-e packet can include 5 bits information previously used for UE Power Headroom (UPH), but which can now indicate the preferred subchannel index. There may be good matching with the 5 bits over E-AGCH and there may not be any impact on the HSUPA physical layer. Furthermore, other bits in the SI for a buffer report can be used to indicate D2D data buffer information.

The request can include the frequency resource information, such as LTE D2D frequency carrier index and subchannel index. The reported frequency information may be based on the measurement of the D2D UE.

Furthermore, the other fields in SI, such as Highest priority Logical channel Identification (ID) (HLID with 4 bits), Total E-DCH Buffer Status (TEBS with 5 bits), and fields related to amount of available data (HLBS with 4 bits) can be used to indicate the corresponding D2D buffer status.

Another option relates to the "Happy bit" in E-DPCCH, in which 1 bit information previously used for requesting more HSPA resource or not, can now indicate whether the UE could use more resources or not for LTE D2D mode.

A suitable device can be enabled to read and interpret the system information block (SIB) or L3 signaling transmitted by BS according to the above-described examples, where support for LTE D2D is indicated. If the BS indicates support for LTE D2D, the device can then indicate its LTE D2D capability to the BS. If the BS has no support for LTE D2D, it may not able to interpret the UE's LTE D2D capability notification.

Assuming two LTE D2D carriers and 10 MHz (i.e. 48 Physical Resource Blocks (PRBs) for data) per carrier, the reported/granted subchannel Indexing can be expressed as discussed below.

The first bit can indicate which carrier is preferred. The remaining four bits can then indicate which subchannel is preferred in that carrier. Thus, $2^4=16$ subchannels and 3 PRBs per subchannel can be indicated. Table 1 illustrates this mechanism.

TABLE 1

| Carrier | Subchannel Index | | | |
|---|---|---|---|---|
| bit 0 | bit 1 | bit 2 | bit 3 | bit 4 |

In a second embodiment, the remaining four bits would indicate which set of subchannels are preferred in that carrier. For example, 1 bit means one subchannel with 12 PRBs and totally 4 subchannels. This mechanism is illustrated in Table 2.

TABLE 2

| Carrier | Sub 1 | Sub 2 | Sub 3 | Sub 4 |
|---|---|---|---|---|
| bit 0 | bit 1 | bit 2 | bit 3 | bit 4 |

The above-identified techniques, systems, and devices may lead to certain benefits. For example, it is easy to support LTE D2D in an HSPA system with quite minor modifications to the existing HSPA system. Most of these modification may be able to be accomplished by updating software. Thus, both the BS and UE of certain embodiments of the present invention may be equipped with at least one memory and at least one processor. The at least one memory can be random access memory (RAM), a hard disc drive (HD) or the like. The memory can include and store a computer program made up of a set of instructions for performing the necessary process. This program serve to convert the processor from a general purpose processor to specific purpose processor. The processor can be a general purpose central processing unit (CPU), or an application specific integrated circuit (ASIC) in two examples. The memory, computer program, and processor can be configured to, with one another, cause the UE, BS, or similar device to support LTE D2D in an HSPA system.

Additionally, certain embodiments of the present invention can improve the spectrum efficiency significantly and provide additional benefits. For example, LTE D2D and HSPA BS can easily interpret the information correctly (either for HSUPA or LTE D2D) according to its own communication mode status without any extra signaling in the air interface. Furthermore, the same approach could be also extended to other cellular systems, especially 3GPP compatible systems without departing from the scope of the invention.

Other benefits are also possible. The whole scheduling procedure can be terminated at HSPA BS side with minor complexity and fast scheduling. Users can benefit from utilizing LTE radio capabilities before widespread network deployment. Additionally, operators can offer new services and sell more LTE D2D capable terminals in view of the implementation of certain embodiments of the present invention.

The procedure discussed above may be further seen through reference to FIG. 1, which illustrates HSPA system assisted LTE D2D communication. As shown in FIG. 1, in a first step (1), an SI including a subchannel index and buffer can be sent in a Mac-e packet via E-DCH channels from a first unit, which may be a mobile unit. In particular, the unit may move into a coverage area in which implementation of certain embodiments of the present invention would be helpful.

In a second step (2), the HSPA BS can reply with a scheduling grant. The scheduling grant can be transmitted via E-RGCH and/or E-AGCH. If the granted subchannel is exactly the same as the requested one, the scheduling flag over E-RGCH may be enough. Thus, there may not be any need to use E-AGCH anymore. If the E-RGCH is not enough (for example, if the granted subchannel is not exactly the same as the requested one), E-AGCH can be used to indicate some other subchannels.

Power control and interference considerations can also be integrated into the systems and techniques discussed above. UEs can be scheduled by HSPA BS and they can utilize LTE resources for D2D where there is no LTE coverage. Therefore the interference caused by D2D transmission may not be as crucial as it would be in D2D in-band operation.

In HSPA assisted LTE D2D, the BS may have no knowledge about the interference situation and hence may not be able to give D2D power control commands. One solution for D2D power control may be as follows. Devices can decide by themselves what transmission power level they utilize or utilize fixed power during D2D communication. Initial power and the "autonomous" power level selection can be indicated with higher layer signaling (e.g. L3 signaling). Thus, the power control would not require any modifications to HSPA L2 channels/signaling messages. In case of high inter-cell interference from other LTE D2D users, devices can select new a subchannel from the available subchannels indicated by the BS. When devices are in D2D mode, the transmissions on HSPA control channels can be interpreted as D2D control signaling messages.

Uplink DPCCH gating in Release 7 of 3GPP (Rel. 7) with LTE D2D is another consideration. DPCCH transmission may be important in an HSPA system. In 3GPP Rel. 7, uplink DPCCH gating can be used to improve the uplink performance by transmitting DPCCH periodically to avoid high interference in the uplink during the inactive time. Thus, DPCCH gating can be configured within a particular period for uplink synchronization during D2D mode. Then, the remaining time can be used for LTE D2D transmission, which can reduce the total transmission power and save the UE power for a longer standby time.

Figure 2:
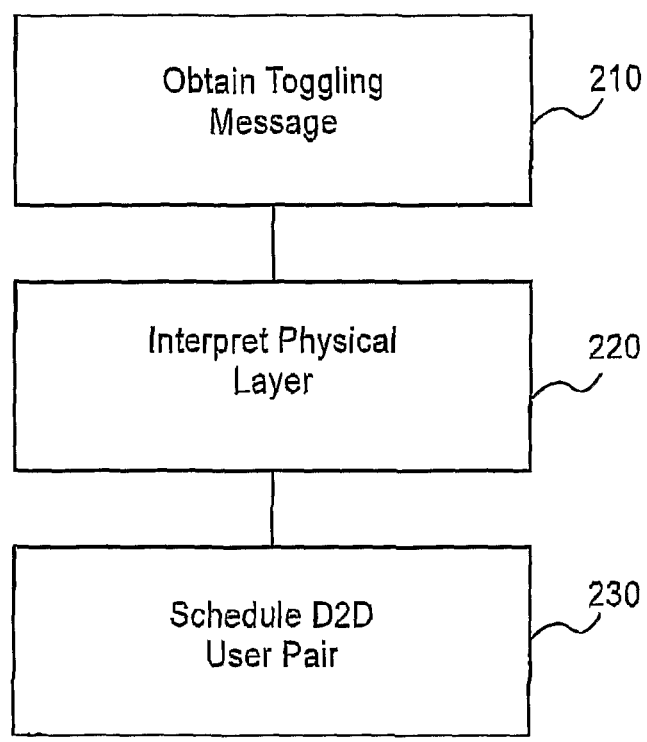
FIG. 2 illustrates a method according to certain embodiments of the present invention.

FIG. 2 illustrates a method according to certain embodiments of the present invention. As shown in FIG. 2, a method can include obtaining 210 a direct user equipment communication toggling message. The method can also include interpreting 220 physical layer signaling on a first frequency of a first radio system based on the toggling message. The method can further include scheduling 230 a direct user equipment pair on a second frequency of a second system based on the interpreting. The toggling message can include a triggering message to initiate direct user equipment communication or an exit message to terminate direct user equipment communication.

The scheduling 230 the direct user equipment pair can include scheduling the pair for non-contention based access. The scheduling 230 the direct user equipment pair can include scheduling the pair for access to long term evolution direct-to-direct frequency resources. The scheduling 230 the direct user equipment pair can include scheduling according to scheduling requests sent over high speed packet access channels from the pair.

The scheduling 230 can be performed by a base station. The scheduling 230 can include granting frequency resources characterized by a direct-to-direct carrier index and subchannel index of the pair having an existing high speed packet access channel.

Figure 3:
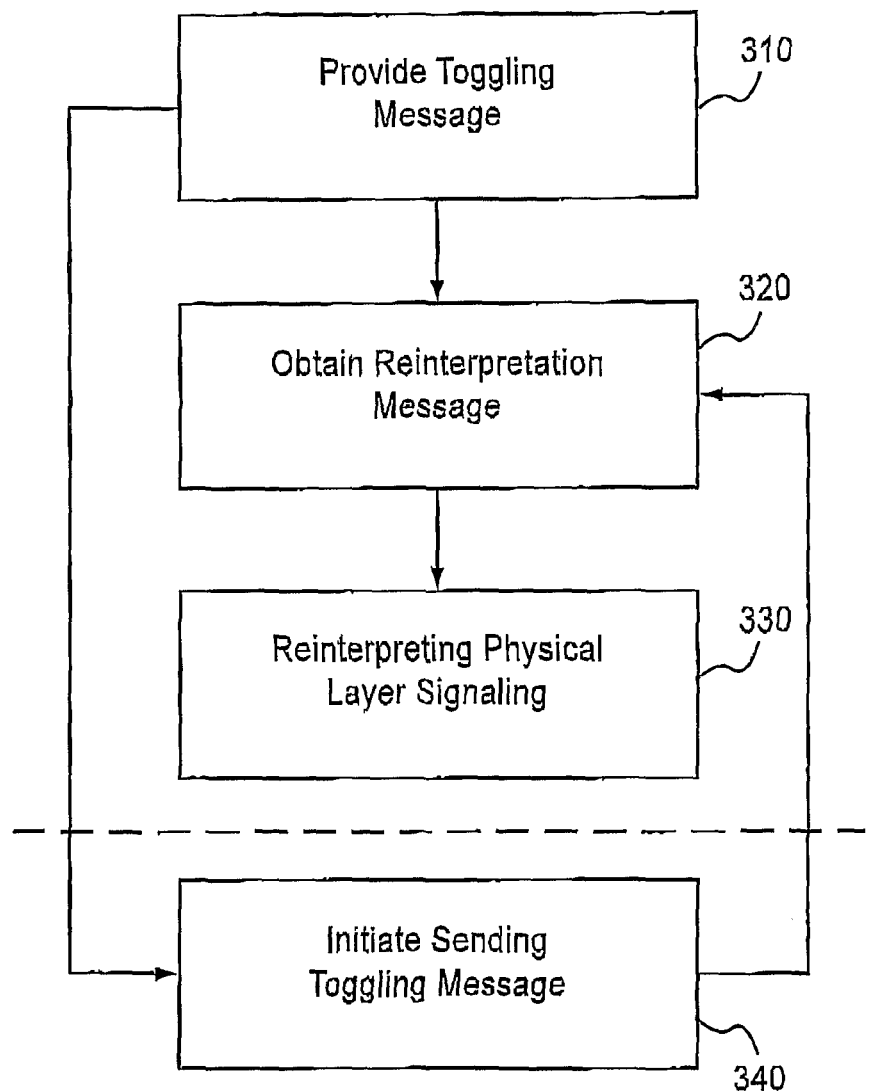
FIG. 3 illustrates a method according to certain embodiments of the present invention.

FIG. 3 illustrates a method according to certain embodiments of the present invention. As shown in FIG. 3, the method can include providing 310 a direct user equipment communication toggling message. The method can also include obtaining 320 a reinterpretation message responsive to the toggling message. The reinterpretation message can indicate how specific signally should be interpreted differently than previously.

The method can further include reinterpreting 330 physical layer signaling on a first frequency of a first radio system based on the reinterpretation message, wherein the direct user equipment communication is to be conducted on a second frequency of a second radio system. The toggling message can include a triggering message to initiate direct user equipment communication or an exit message to terminate direct user equipment communication.

The toggling message can include at least one of layer 2 or layer 3 signaling. The reinterpreting 330 can be performed by a user equipment. The providing 310 the toggling message can include initiating sending a direct-to-direct scheduling request to a high speed packet access node B. The providing 310 the toggling message can include initiating sending the toggling message using a high speed uplink packet access scheduling information element in an enhanced media access control packet. The providing 310 the toggling message comprises initiating sending the toggling message over an enhanced dedicated channel.

The method can further include indicating 340 in the toggling message, which frequency resource would be preferred for long term evolution direct-to-direct communication.

One example reinterpreting 330 can be to interpret one bit of E-RGCH previously used for UP/DOWN commands instead as indicating whether the corresponding D2D pair is scheduled. Another example reinterpreting 330 can be to interpret some bits previously used for E-DPDCH/DPCCH power ratio information in HSUPA instead as indicating which subchannel is scheduled for the corresponding D2D pair. A further example reinterpreting 330 can be to interpret some bit or bits of E-AGCH previously used for process applicability instead as indicating the resource lifetime.

Figure 4:
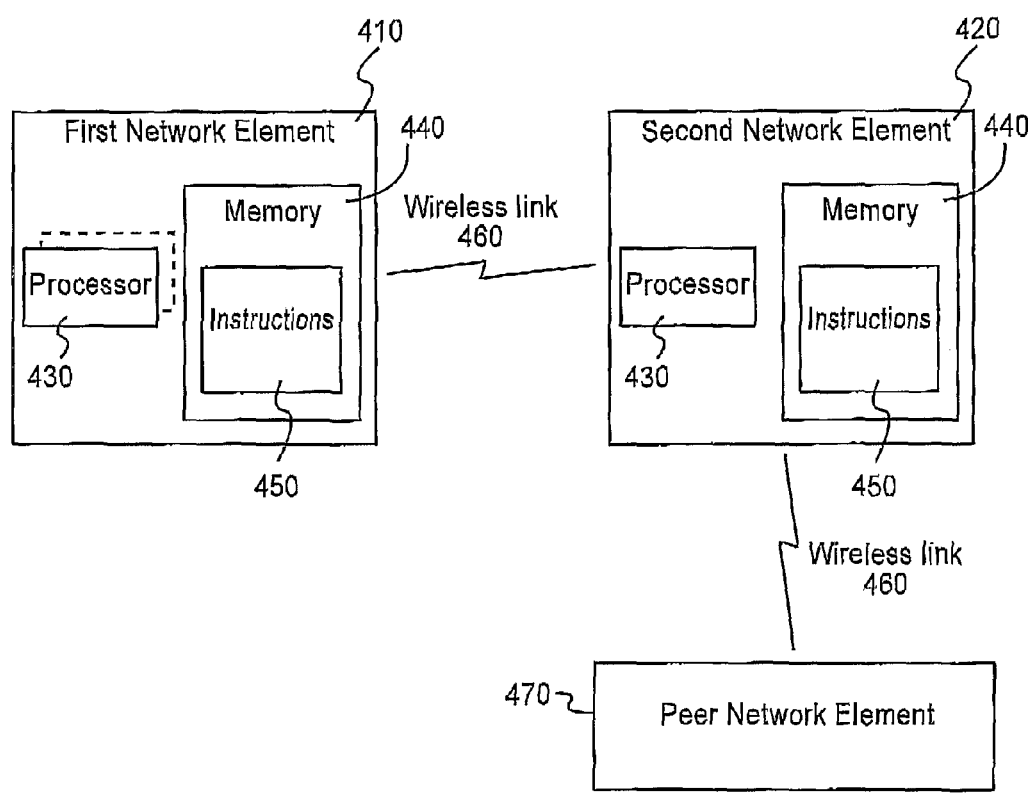
FIG. 4 illustrates a system according to certain embodiments of the present invention.

FIG. 4 illustrates a system according to certain embodiments of the present invention. The system of FIG. 4 can include a first network element 410 and a second network element 420. The first network element 410 can be a base station and the second network element 420 can be a user equipment, such as a mobile terminal. The first network element 410 and the second network element 420 can each include at least one processor 430, at least one memory 440, and at least one set of computer program instructions 450. The first network element 410 can be configured, for example, to perform the methods discussed above with reference to FIG. 2. The second network element 420 can be similarly configured, for example, to perform the methods discussed above with reference to FIG. 3.

As shown in FIG. 4, the first network element 410 and the second network element 420 can be connected by a wireless link 460. An additional peer network element 470 to the second network element 420 may also be part of the system. The peer network element 470 may be constructed similarly to the second network element 420.

Figure 5:
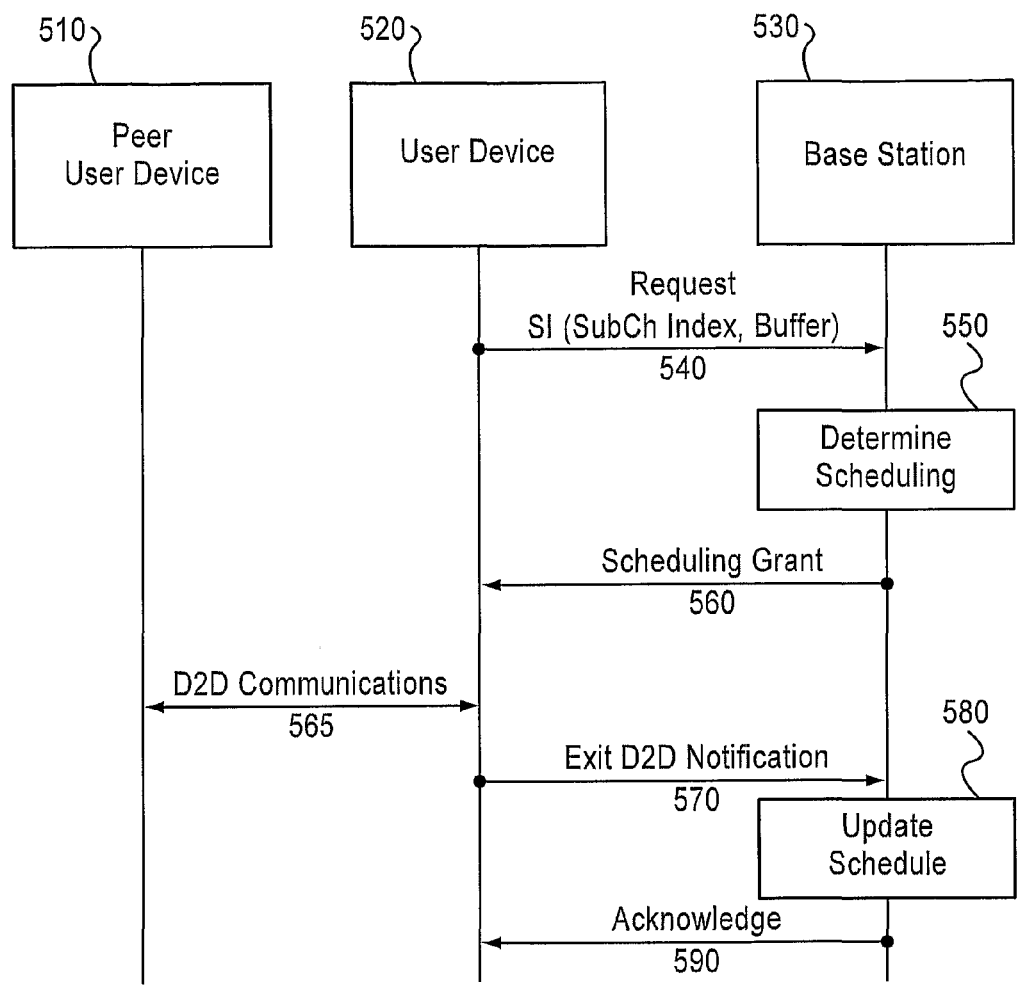
FIG. 5 illustrates a signal flow according to certain embodiments of the present invention.

FIG. 5 illustrates a signal flow according to certain embodiments of the present invention. FIG. 5 shows signaling interaction, in an example embodiment, amongst a user device 520, a base station 530, and a peer user device 510. The user device 520 may signal a request 540 for scheduling of D2D communications. Responsive to the request 540, the base station 530 can determine 550 appropriate scheduling for the user device 520 and peer user device 510. The base station 530 can than communicate a scheduling grant 560 back to the user device 520 including either a flag that the proposed scheduling was accepted, or an alternative schedule, if applicable.

As shown in FIG. 5, the user device 520 and peer user device 510 can then engage in direct-to-direct communication 565 for a period of time. Although this is shown as a single signaling line in FIG. 5, the session of communication between the user device 520 and peer user device 510 can be very lengthy. When the session is complete, the user device 520 can provide a notification 570 of the end of or exit from direct-to-direct communication to the base station 530. This notification 570 can also serve to toggle the base station 530 to revert to previous treatment of L2/L3 signaling from the user device 520, just as the request 540 previously similarly toggled treatment of L2/L3 signaling. The base station 530 can update its schedule 580 and then acknowledge 590 that the scheduling has been updated or simply that the exit D2D notification 570 has been received. This example embodiment should be understood to be illustrative only, and not limiting.

One embodiment of the present invention, not specifically shown, is a method in which one radio system's base station is used to control the UE D2D operation on another radio system. The base station uses a first frequency to control the operation and the operation itself is on a second frequency that is different from the first frequency. The first frequency is a frequency of one radio system, and the second frequency is a frequency of the other radio system.

Another embodiment of the present invention, also not specifically shown, is an apparatus that includes at least one memory including computer program code and at least one processor. The at least one memory and the computer program code are configured to, with the at least one processor, cause the apparatus at least to use a base station of a first radio system to control user equipment direct-to-direct operation on a second radio system. The base station is configured to use a first frequency to control the operation. The operation itself is to be conducted on a second frequency that is different from the first frequency. The first frequency is a frequency of the first radio system, and the second frequency is a frequency of the second radio system.

One having ordinary skill in the art will readily understand that the invention as discussed above may be practiced with steps in a different order, and/or with hardware elements in configurations which are different than those which are disclosed. For example, the E-RGCH may be used to indicate the lifetime instead of the scheduling command as discussed herein. Other reinterpretations are also possible without departure from the scope of the invention disclosed herein. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    obtaining a direct user equipment communication toggling message from a user equipment enabled to communicate on a first frequency of a first radio system in a first radio system coverage area and as one of a direct user equipment pair on a second frequency of a second radio system;
    interpreting physical layer signaling on the first frequency of the first radio system based on the toggling message; and
    scheduling a direct user equipment pair communication on the second frequency of the second radio system in the first radio system coverage area based on the interpreting, wherein the user equipment is one of the direct user equipment pair, so that the control of the direct user equipment pair communication on the second frequency is based on the interpreting of the physical layer signaling on the first frequency, wherein the toggling message comprises a triggering message to initiate the direct user equipment communication or an exit message to terminate the direct user equipment communication.

2. The method of claim 1, wherein the scheduling the direct user equipment pair comprises at least one of:
    scheduling the pair for non-contention based access;
    scheduling the pair for access to long term evolution direct-to-direct frequency resources;
    scheduling according to scheduling requests sent over high speed packet access channels from the pair.

3. The method of claim 1, wherein the scheduling comprises granting frequency resources characterized by a direct-to-direct carrier index and subchannel index of the pair having an existing high speed packet access channel.

4. A computer program encoded on a non-transitory computer-readable medium, which, when executed on a computer processor, performs a method according to claim 1.

5. A method, comprising:
    providing a direct user equipment communication toggling message by a user equipment enabled to communicate on a first frequency of a first radio system in a first radio system coverage area and as one of a direct user equipment pair on a second frequency of a second radio system;
    obtaining by the user equipment a reinterpretation message responsive to the toggling message; and
    reinterpreting physical layer signaling on the first frequency of the first radio system based on the reinterpretation message, wherein the user equipment is one of the direct user equipment pair and a direct user equipment communication is to be conducted on the second frequency of the second radio system in the first radio system coverage area, so that the direct user equipment pair communication on the second frequency is controlled based on the reinterpreting of the physical layer signaling on the first frequency,
    wherein the toggling message comprises a triggering message to initiate the direct user equipment communication or an exit message to terminate the direct user equipment communication.

6. The method of claim 5, wherein the providing the toggling message comprises at least one of:
    initiating sending a direct-to-direct scheduling request to a high speed packet access node B;
    initiating sending the toggling message using a high speed uplink packet access scheduling information element in an enhanced media access control packet;
    initiating sending the toggling message over an enhanced dedicated channel.

7. The method of claim 5, further comprising:
    indicating in the toggling message, which frequency resource would be preferred for long term evolution direct-to-direct communication.

8. An apparatus, comprising:
    at least one memory including computer program code; and
    at least one processor,
    wherein the at least one memory and the computer program code are configured to, with the at least one processor, cause the apparatus at least to
    obtain a direct user equipment communication toggling message by the apparatus enabled to communicate on a first frequency of a first radio system in a first radio system coverage area and as one of a direct user equipment pair on a second frequency of a second radio system;
    interpret physical layer signaling on the first frequency of the first radio system based on the toggling message; and
    schedule a direct user equipment pair communication on the second frequency of the second system in the first radio system coverage area based on the interpreting, wherein the apparatus is one of the direct user equipment pair, so that the control of the direct user equipment pair communication on the second frequency is based on the interpreting of the physical layer signaling on the first frequency,
    wherein the toggling message comprises a triggering message to initiate the direct user equipment communication or an exit message to terminate the direct user equipment communication.

9. The apparatus of claim 8, wherein the at least one memory and the computer program code are configured to, with the at least one processor, cause the apparatus at least to schedule the direct user equipment pair by scheduling the pair for non-contention based access.

10. The apparatus of claim 8, wherein the at least one memory and the computer program code are configured to, with the at least one processor, cause the apparatus at least to schedule the direct user equipment pair by scheduling the pair for access to long term evolution direct-to-direct frequency resources.

11. The apparatus of claim 8, wherein the at least one memory and the computer program code are configured to, with the at least one processor, cause the apparatus at least to schedule the direct user equipment pair by scheduling according to scheduling requests sent over high speed packet access channels from the pair.

12. The apparatus of claim 8, wherein the at least one memory and the computer program code are configured to, with the at least one processor, cause the apparatus at least to schedule by granting frequency resources characterized by a direct-to-direct carrier index and subchannel index of the pair having an existing high speed packet access channel.

13. The apparatus of claims 8, wherein the at least one memory and the computer program code are also configured to, with the at least one processor, cause the apparatus to perform at least one of:
  interpret one bit of enhanced relative grant channel previously used for up/down commands instead as indicating whether the corresponding direct user equipment pair is scheduled;
  interpret some bits previously used for enhanced dedicated physical data channel/dedicated physical control channel power ratio information in high speed uplink packet access instead as indicating which subchannel is scheduled for the corresponding direct user equipment pair;
  interpret some bit or bits of enhanced absolute grant channel previously used for process applicability instead as indicating a resource lifetime.

14. An apparatus, comprising:
  at least one memory including computer program code; and
  at least one processor,
  wherein the at least one memory and the computer program code are configured to, with the at least one processor, cause the apparatus at least to
  provide a direct user equipment communication toggling message from a user equipment enabled to communicate on a first frequency of a first radio system in a first radio system coverage area and as one of a direct user equipment pair on a second frequency of a second radio system;
  obtain by the user equipment a reinterpretation message responsive to the toggling message; and
  reinterpret physical layer signaling on the first frequency of the first radio system based on the reinterpretation message, wherein the user equipment is one of the direct user equipment pair and a direct user equipment communication is to be conducted on the second frequency of the second radio system in the first radio system coverage area, so that the direct user equipment pair communication on the second frequency is controlled based on the reinterpretation message,
  wherein the toggling message comprises a triggering message to initiate the direct user equipment communication or an exit message to terminate the direct user equipment communication.

15. The apparatus of claim 14, wherein the apparatus comprises the user equipment.

16. The apparatus of claim 14, wherein the at least one memory and the computer program code are configured to, with the at least one processor, cause the apparatus at least to provide the toggling message by initiating sending a direct-to-direct scheduling request to a high speed packet access node B.

17. The apparatus of claim 14, wherein the at least one memory and the computer program code are configured to, with the at least one processor, cause the apparatus at least to provide the toggling message by initiating sending the toggling message using a high speed uplink packet access scheduling information element in an enhanced media access control packet.

18. The apparatus of claim 14, wherein the at least one memory and the computer program code are configured to, with the at least one processor, cause the apparatus at least to provide the toggling message by initiating sending the toggling message over an enhanced dedicated channel.

19. The apparatus of claim 14, wherein the at least one memory and the computer program code are also configured to, with the at least one processor, cause the apparatus at least to indicate in the toggling message, which frequency resource would be preferred for long term evolution direct-to-direct communication.

20. The apparatus of claims 14, wherein the at least one memory and the computer program code are also configured to, with the at least one processor, cause the apparatus to perform at least one of:
  reinterpret one bit of enhanced relative grant channel previously used for UP/DOWN commands instead as indicating whether the corresponding direct user equipment pair is scheduled;
  reinterpret some bits previously used for enhanced dedicated physical data channel/dedicated physical control channel power ratio information in high speed uplink packet access instead as indicating which subchannel is scheduled for the corresponding direct user equipment pair;
  reinterpret some bit or bits of enhanced absolute grant channel previously used for process applicability instead as indicating a resource lifetime.

* * * * *